(12) United States Patent
Barrett

(10) Patent No.: US 7,418,798 B2
(45) Date of Patent: Sep. 2, 2008

(54) POLE HOLDER

(76) Inventor: James Roy Barrett, 4019 178th Pl. NE., Arlington, WA (US) 98223

(*) Notice: Subject to any disclaimer, the term of this patent is extended or adjusted under 35 U.S.C. 154(b) by 9 days.

(21) Appl. No.: 11/036,657

(22) Filed: Jan. 14, 2005

(65) Prior Publication Data

US 2006/0032106 A1    Feb. 16, 2006

Related U.S. Application Data

(60) Provisional application No. 60/601,909, filed on Aug. 16, 2004.

(51) Int. Cl.
*A01K 97/10* (2006.01)
(52) U.S. Cl. ........................................ 43/21.2
(58) Field of Classification Search ............ 43/21.2, 43/27.4
See application file for complete search history.

(56) References Cited

U.S. PATENT DOCUMENTS

| | | | | |
|---|---|---|---|---|
| 2,137,645 A * | 11/1938 | Doench | ...... | 43/21.2 |
| 2,139,826 A * | 12/1938 | Huntley | ...... | 248/545 |
| 2,293,305 A * | 8/1942 | Oldham | ...... | 43/21.2 |
| 2,751,174 A * | 6/1956 | Parker | ...... | 248/513 |
| D215,436 S * | 10/1969 | Moore | ...... | D22/147 |
| 3,586,274 A * | 6/1971 | Hart | ...... | 248/530 |
| D267,031 S * | 11/1982 | Hamlin | ...... | D22/147 |
| 4,565,025 A * | 1/1986 | Behrle | ...... | 43/21.2 |
| 4,656,774 A * | 4/1987 | Terrill | ...... | 43/21.2 |
| 4,694,603 A * | 9/1987 | Anderson | ...... | 43/21.2 |
| 4,739,575 A * | 4/1988 | Behrle | ...... | 43/21.2 |
| 4,866,873 A * | 9/1989 | Van Valkenburg | ...... | 43/21.2 |
| D332,821 S * | 1/1993 | Padilla | ...... | D22/147 |
| D416,976 S * | 11/1999 | Sizer | ...... | D22/147 |
| 6,185,855 B1 * | 2/2001 | Sizer et al. | ...... | 43/21.2 |
| D489,118 S * | 4/2004 | Preiss | ...... | D22/147 |

\* cited by examiner

*Primary Examiner*—David J Parsley

(57) ABSTRACT

A device, fashioned and formed to secure a long shafted object, primarily, but not limited to a fishing pole. The embodiment comprises of a shaft/distal end that enters a nonimpervious surface at the shores edge. Coils are used to support the fishing poles aft handle. A support arm extending to a cradle for supporting the forward handle or backbone of the fishing pole. The user simply slides the aft portion of the pole down into the coils and rests the pole into the cradle, thus provides hands free support.

1 Claim, 1 Drawing Sheet

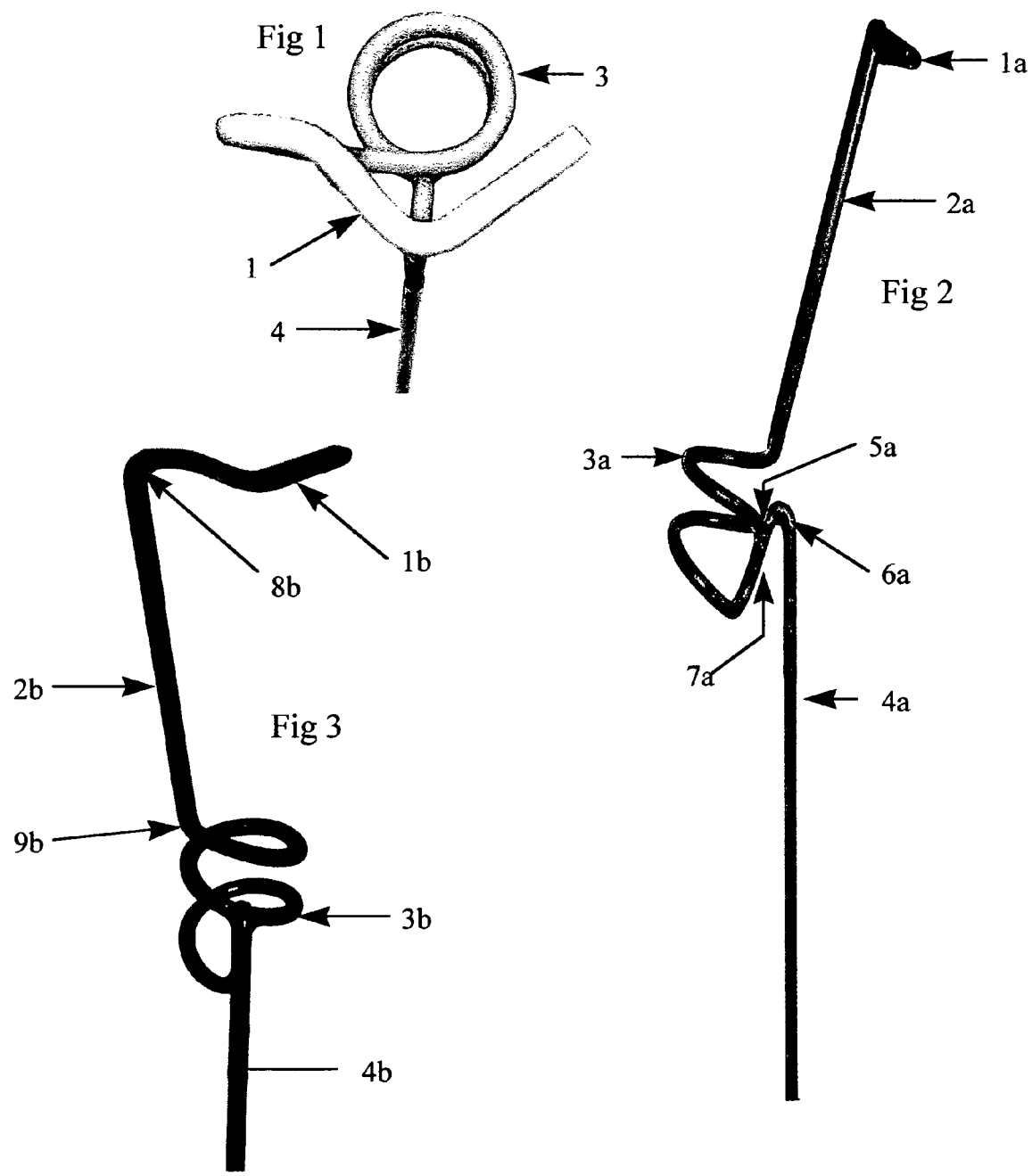

POLE HOLDER

CROSS REFERENCE TO RELATED APPLICATION

Disclosure Document # 553575 was filed on May 21, 2004 by the same and current applicant, entitled "Fishing pole holder". Provisional Patent application No. 60/601,909 also submitted by the same and current applicant, entitled "POLE HOLDER" on Aug. 16, 2004.

STATEMENT OF FEDERALLY SPONSORED RESEARCH/DEVELOPMENT

N/A

REFERENCE TO A "SEQUENCE LISTING"

N/A

BACKGROUND OF THE INVENTION

For as long as fishermen have fished from the shoreline, there has been a need to secure a fishing pole without physical contact by the fisherman during the act of fishing. A majority of present-day fishermen fish from the shore, due to the expense of fishing from a boat. Of those, a majority share a need or desire to secure their fishing pole unattended, by way of what ever means possible, "Y" shaped sticks, bushes or other rudimentary methods, with varying degrees of success, all the while trying to elevate the fishing poles tip. This is supported by the amount of patents issued for fishing pole holders. There are currently over two hundred and fifty patents for pole holders and of those over one hundred fifty are designated for fishing poles. Yet there are only a handful of shoreline fishing pole holders currently in the market place. Of those available, some use components of prior art patented devices.

Padilla, dated Jan. 26, 1993, uses a series of coils to support the aft handle of the fishing pole. One device on the market uses a series of coils to secure the aft handle of the fishing pole but uses material from the last coil to form a straight ground penetrating shaft. Padilla's uses a portion of the coils bent at a 90 degree angle, attach to a shaft, that enters the ground. This design however does not provide forward handle support and has limited available fishing pole angle.

Behrle, dated Oct. 31, 1989, used a formed material, "U" shaped for support of the forward handle of the fishing pole and an upside down "U" shape for the aft handle of the fishing pole. A similar device on the market uses the same frame principle with a ground penetrating shaft from the upside down "U". This design relays on balance to keep the fishing pole secured, preventing elevated angle for the fishing poles tip.

Terrill, dated Apr. 14, 1987, also used a similar frame as Behrle's with an auger type distal ground penetrating apparatus. Terrill's design also prevents an elevated angle for the fishing poles tip.

Culp, dated Aug. 9, 1983, Culp's design uses a wire box arrangement. It provides enclosed support for the aft handle and a cradle to support the forward handle/backbone with a pointed ground penetrating shaft. This design also provides limited tip elevation and appears bulky and cumbersome.

Another design on the market relies on fishing pole handle ground contact. An "M" shaped design with the two outside ends entering the ground, the center of the "M", the "V" to cradle the backbone of the pole leaving the handle to rest on the ground. Similar features can be found in Newton's, et al., dated May 15, 1990 and Beachel, dated Feb. 6, 1996.

A common feature of many shoreline fishing pole holders is that of a sharpened ground penetrating shaft, Ibarra, dated Dec. 10, 2002, Huff, dated Dec. 1, 1998, Lippstock, dated Dec. 14, 1993, Ewald, dated Sep. 19, 1989, Campbell date Jun. 7, 1988. A sharpened ground penetrating shaft/distal can be very dangerous and not really necessary. Many children enjoy fishing along shorelines and a sharpened shaft should be of great concern. With the present invention it was found simply pushing a blunt distal, penetrated a non-impervious surface easier than first thought.

Preiss, dated Apr. 27, 2004. This design has many correct aspects. A hoop to secure the aft handle, an arm to a formed "U" shape for support of the forward handle. This ornamental design has two base figures, a triangle as shown in FIG. 1 through 7 and a ground penetrating shaft, FIG. 8 through 14. A bent formation is detailed in the ground penetrating shaft for what appears to be a stop to prevent the holder from tipping over, a ground insertion aid or a device to prevent rotation of the holder? Although, do to a lack of detail, it appears the ground penetrating shaft is very short and not conducive to secure that of an active fishing pole. The angle of the arm is also suspect to provide a proper elevated angle for the fishing poles tip. The design also uses just one side for the ground penetrating shaft and the arm, which brings its balance to issue for stability.

Fishing poles and associated equipment range in price, most operators take great care of their investment and expect quality products to protect their investments. There are a very limited amount of shoreline fishing pole holders presently on the market and none really provide the performance expected, some relying on fishing pole ground contact. Current holders in the market place also don't provide steep enough pole angles conducive to the flexibility of the fishing poles for maximum efficiency. Flexibility of a fishing pole is paramount, this is the only way of relieving stresses on the actual fishing line.

SUMMARY OF THE INVENTION

The presented invention allows fishermen to safely and efficiently secure their fishing pole, during the act of fishing without physical contact. The invention is inserted into a nonimpervious surface, by way of a long shaft/distal end. The user casts their bait into the body of water and simply slides their fishing pole handle into the coils and rests the forward handle in the cradle. When a fish strike occurs, the user simply removes the fishing pole from the pole holder in reverse order of it's installation and reels in the fish.

The presented invention is designed to allow the user to secure their fishing pole at a angle of approx. 60 to 80 degrees to utilize the flexibility of the fishing pole. The presented invention is simple, one piece construction which has no extra parts to loosen, break or become lost.

BRIEF DESCRIPTION OF DRAWING VIEWS

FIG. 1, TOP VIEW
1) cradle
3) coils
4) distal end
FIG. 2, SIDE VIEW
1a) cradle
2a) support arm
3a) coils
4a) distal end 5a) weld point
6a) distal angle, approx. 140 degrees
7a) substrate FIG. 3, FRONT VIEW
1b) cradle
2b) support arm
3b) coils
4b) distal end
8b) angle, approx. 100 degrees
9b) angle, approx. 45 degrees

DETAILED DESCRIPTION OF THE INVENTION

The embodiment begins with a single long metal stock, 48" minimum. A solid steel rod is the preferred material. The diameter of the material can vary depending on the users requirements. The diameters range from 0.250" to approx. 0.500". The larger diameters provide better rigidity for heavier applications, hence smaller diameters can be useful for lighter applications. The length of the shaft/distal end will depend on the users specific requirements, desired pole heights, nonimpervious surface conditions, sandy soils etc. The longer the distal end the deeper it can be inserted into the ground for added stability.

For the following paragraphs to avoid clutter and confusion, only the best Fig. view will be described to recognize specific details. This however is not to diminish aspects of the views not recognized.

The forming begins at the distal end (4a) FIG. 2. The distal end should be a approx. 17.0" min in length. At the top of the distal end a sharp angle, approx. 140 degrees is formed (6a) FIG. 2 creating a substrate (7a) FIG. 2, which is formed down a desired length, in line with the said distal end to the beginning of the formation of the first coil (3a) FIG. 2 wrapping up, from the substrate (7a) FIG. 2. As the first coil is wrapped it intersects the top of the substrate (7a) FIG. 2. At that intersect point a weld is applied (5a) FIG. 2, securing the first coil to the substrate (7a) FIG. 2. Coils may be one complete wrap or more, providing more than one coil is preferred. Coil diameter is approx. 2.0" ID. Coil spacing is approx. 1.0". After the desired number of coils have been formed the remaining material is 90 degrees from the said distal end (4a) FIG. 2. An angle (9b) FIG. 3 is formed, approx. 45 degrees on a horizontal plane away from the coils forming the support arm (2b) FIG. 3. The support arm (2a) (2b) FIG. 2 and FIG. 3 extends away from the said distal end at a desired distance, approx. 8.0". After the desired distance and angle are achieved, an angle (8b) FIG. 3, approx. 100 degrees is formed towards the center line of the embodiment. At this point a "V" in the material is formed, producing a cradle (1) FIG. 1.

Completing the raw, structure of the preferred embodiment, that will secure a long shafted object. Allowing a fishing pole an angle of approx. 60 to 80 degree from a horizontal plain, a favored and preferred angle to maximize the flexibility of a fishing pole.

Finish will be applied. The finish has two important purposes, first to protect the metal from oxidation and second to protect the finish of the fishing pole. The finish can be but not limited to paint, powder coating, rubberized coating or of a foam material, etc., in any combination there of Colors can be infinite.

The embodiment has been developed with several unique design features not immediately recognized. The length of the support arm has been designed to accommodate a wide verity of pole handles. For a long handled fishing pole, the fishing reel can be placed on top of the cradle (1a) FIG. 2 while the handle slips into the coils (3a) FIG. 2. For a shorter handled fishing pole, the reel can be placed against the upper coil (3a) FIG. 2 with the handle placed through the coils (3a) FIG. 2, leaving the fishing pole upper handle/back bone to rest in the cradle (1) FIG. 1.

Through out testing it was found the placement of the weld point (5a) FIG. 2 on the substrate (7a) FIG. 2 provided limited flexibility through the support arm (2a) (2b) FIG. 2 and FIG. 3. In addition, at the top of the distal (4a) FIG. 2 also provided limited flexibility throughout the entire pole holder. Flexibility during a large, unexpected fish event aides and complements the flexibility of the fishing pole, while reducing stresses on the fishing pole, line and the pole holder.

An optional feature, not shown on the ref drawing sheet is that of a flat plate, approx. 0.157" thick and approx. 2.50" square, welded longitudinally to the center of the distal end (4b) FIG. 3 just below ground level. The optional plate provides additional rigidity to the distal end and prevents rotation of the pole holder. However this option is not preferred due to the fact, the propose of this invention, hands free fishing. When an event occurs it is not always possible to predict what the fish will do. Without the plate installed, the pole holder can rotate side to side. This allows the fishing pole, installed in the pole holder to follow the fish from side to side all the while maintaining pressure on the fishing pole. This pressure also helps keep the fishing pole secured in the pole holder until the user can remove the fishing pole from the pole holder.

The distal end will be blunt yet smooth for safety consideration, as opposed to a sharpened point that could be dangerous. During testing it was found that a blunt distal end penetrated hard soils quite easily.

I claim:

1. A fishing pole support apparatus for supporting a fishing pole in soil at an elevated angle comprising, an integral one-piece length of solid steel rod, said rod having a diameter between 0.250 inches and 0.500 inches and being formed in a substantial vertical configuration, said rod forming a top portion, a bottom portion and an intermediate portion between said top and bottom portions, said top portion of said rod forming a V-shaped cradle adapted to hold a shaft portion of said fishing rod, said cradle directly connected to a support arm extending downwardly from said cradle to said intermediate portion of said steel rod, said support arm being approximately 8 inches in length and directly connected to a plurality of helical coils extending downwardly from the support arm, said support arm extending at an angle between 60 and 80 degrees from the coils, said coils adapted to hold a handle portion of said fishing rod, said coils directly connected to a bottom of a substrate portion in said intermediate portion of said rod, said substrate extending upwardly from a lowermost portion of said coils to a position medial to the vertical length of the coils, a top of said substrate directly connected to the medial portion of said coils via a weld, at the weld said rod forms a sharp curved portion forming an angle of approximately 140 degrees, said curved portion directly connecting the top of said substrate with a top portion of a distal rod portion, said distal rod portion forming said bottom portion of said rod and said distal rod portion disposed in a substantial vertical configuration with respect to said soil and said distal rod portion adapted to be placed into said soil portion to support said support apparatus and said fishing pole above said soil portion.

* * * * *